(No Model.)

2 Sheets—Sheet 1.

C. L. JAEGER.

ELECTRIC RECORDING INSTRUMENT.

No. 605,548.

Patented June 14, 1898.

WITNESSES:

G. W. A. Eisenbraun

Eugenie A. Persides

INVENTOR:

Charles L. Jaeger

BY A. Faber du Faur Jr.

ATTORNEY

THE NORRIS PETERS CO., PHOTO-LITHO., WASHINGTON, D. C.

(No Model.) 2 Sheets—Sheet 2

C. L. JAEGER.

ELECTRIC RECORDING INSTRUMENT.

No. 605,548. Patented June 14, 1898.

WITNESSES:

Gwa Eisenbrauen

Eugenie A. Persides

INVENTOR:

Charles L. Jaeger,

BY A. Faber du Faur Jr.

ATTORNEY

THE NORRIS PETERS CO., PHOTO-LITHO., WASHINGTON, D. C.

UNITED STATES PATENT OFFICE.

CHARLES L. JAEGER, OF MAYWOOD, NEW JERSEY.

ELECTRIC RECORDING INSTRUMENT.

SPECIFICATION forming part of Letters Patent No. 605,548, dated June 14, 1898.

Application filed August 5, 1897. Serial No. 647,160. (No model.)

*To all whom it may concern:*

Be it known that I, CHARLES L. JAEGER, a citizen of the United States of America, and a resident of Maywood, in the county of Bergen and State of New Jersey, have invented a certain new and useful Improvement in Electric Recording Instruments, of which the following is a specification.

My invention relates to distance and speed indicators and recorders; and it consists generally in combining with the usual measuring or indicating device a speed-recorder by means of an electric circuit or circuits, whereby the movable indicator of the measuring or indicating device at certain points on its course will close the circuit and cause a spark to pass between two terminals and through an interposed medium, thus making or burning a hole through said medium at every closing of the circuit, and therefore making a record every time the movable indicator travels a certain distance.

The nature of my invention will best be understood when described in connection with the accompanying drawings, in which—

Figures 1, 2:
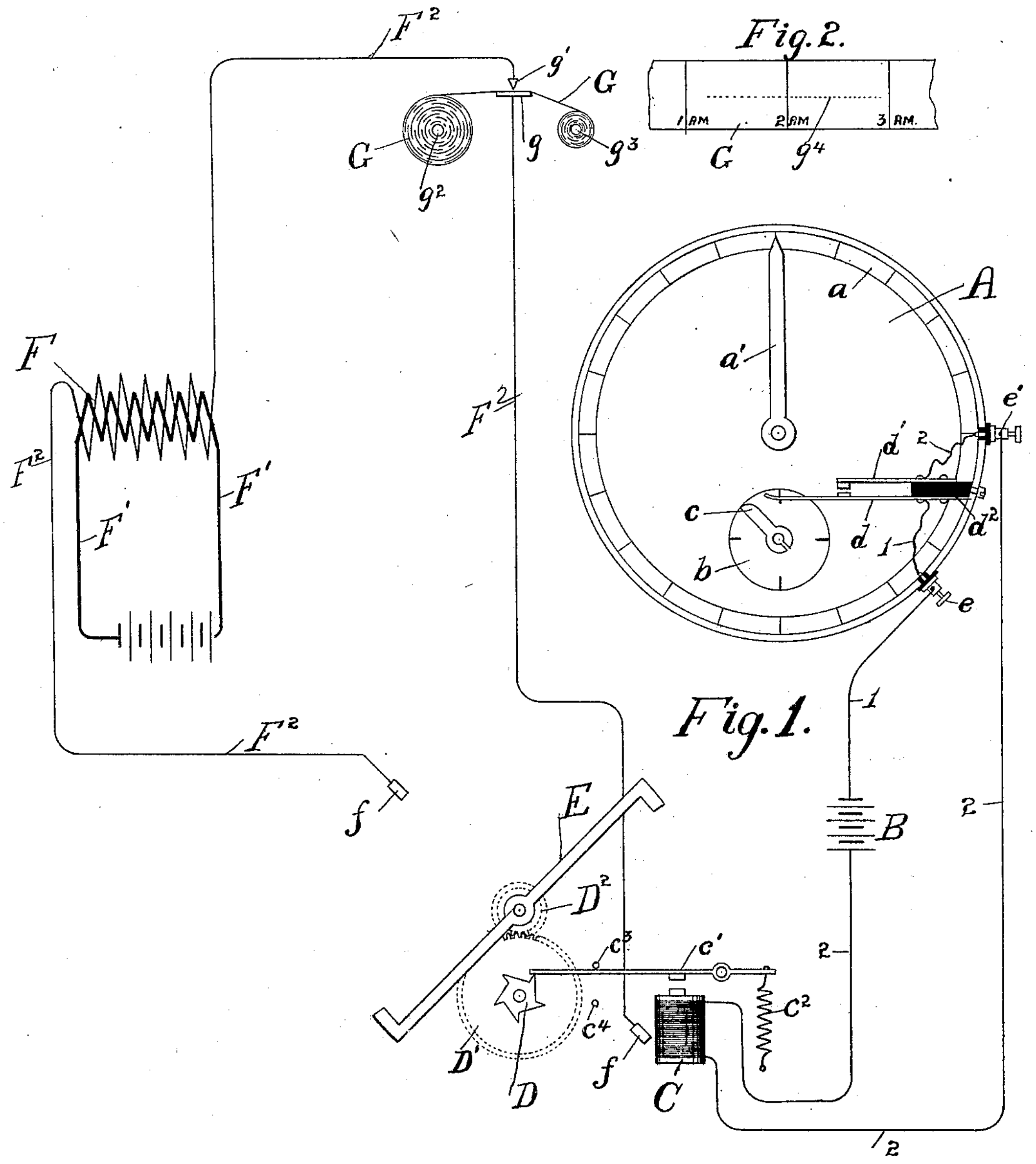
Figures 3, 4:
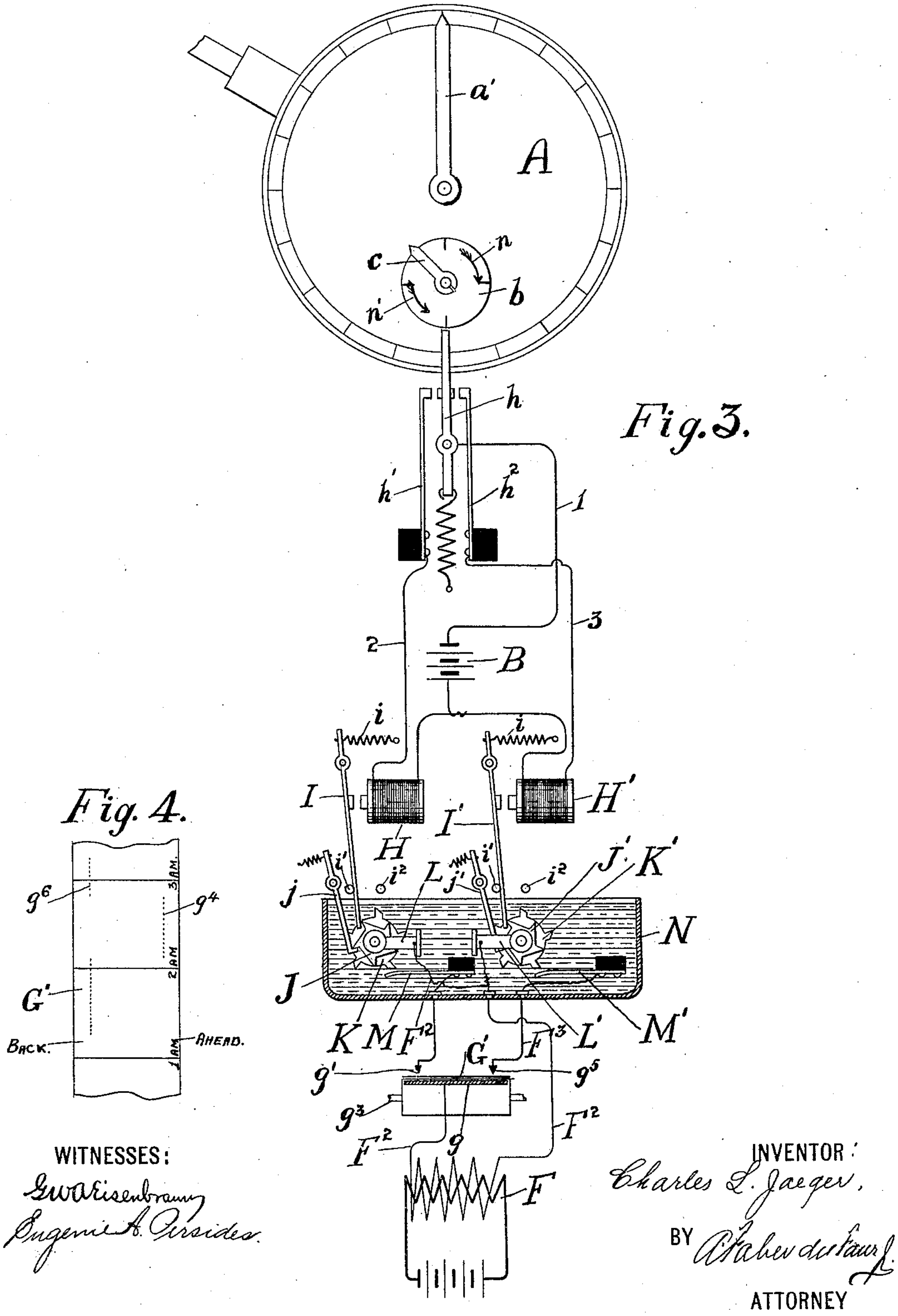

Figure 1 represents a diagrammatic view showing my invention as applied to a ship's log or other distance-measuring or speed-indicating device. Fig. 2 is a plan, partly broken away, showing the recording-strip to be used in the construction shown in Fig. 1. Fig. 3 is a similar view showing the method of recording the distance and speed in two opposite directions. Fig. 4 is a plan, partly broken away, showing the recording-strip for the construction shown in Fig. 3.

Similar letters of reference designate corresponding parts throughout the several views of the drawings.

Referring at present to Fig. 1 of the drawings, the letter A designates an ordinary distance-measuring device or speed-indicator for a ship or engine, having the large dial *a* and radial indicating-hand *a'* and the small dial *b* and small revolving indicating-hand *c*. The large hand *a'* is arranged to move a short specified distance on the dial *a* while the hand *c* is making a complete revolution on its dial *b*; but as these features are old it is not necessary to describe the same. Two contact-plates *d* and *d'* are separated by insulation $d^2$, which is secured to the rim of the indicator A. The spring-plate *d* extends over the course of the hand *c* and is adapted to be forced into contact with the plate *d'* by the hand *c* on every revolution of the same. B is a battery or other electric generator, one pole of which is connected by the line 1 with the spring-plate *d*. The opposite pole of the battery B is connected by the line 2 with the contact *d'*, an intermediate electromagnet C forming part of said line 2. Two posts *e* and *e'* on the rim of the indicator A connect the interior and exterior portions of the lines 1 and 2, respectively. The armature *c'* of the magnet C is pivoted above said magnet and normally withheld from contact with the same by a spring $c^2$. Two stops $c^3$ and $c^4$ limit the upward and downward movements of the armature *c'*. The free end of the armature *c'* extends over a star-wheel D and is adapted to rotate said wheel step by step when the armature is drawn down by its magnet.

D' is a gear mounted so as to rotate in unison with the star-wheel D.

$D^2$ is a pinion engaging with the gear D' and adapted to be rotated thereby.

E is a diametrical contact-arm having the same center as the pinion $D^2$ and mounted so as to rotate in unison with said pinion.

F is an induction-coil provided with an automatic contact-breaker of a usual construction, F' being the primary coil and $F^2$ the secondary coil. The two extremities of the secondary coil $F^2$ are provided with contact-plates *f f*, and the arm E at every half-revolution is adapted to touch, or nearly touch, said plates, so as to complete the circuit between them. A portion of the line $F^2$ of the secondary coil is broken, one end of said break connecting with a platen *g*, of metal or other conducting material, the other end *g'* of the break nearly touching said platen.

G is a strip or tape wound on two reels $g^2$ $g^3$ and extending over the platen *g*, which is situated between said reels. The strip G is caused to wind from one reel onto the other by means of clock mechanism, (not necessary to be shown or described,) and said strip is marked by sections of uniform length, each section of which is adapted by the clock mechanism to pass the point *g'* of the line $F^2$ in a certain specified time. The instantaneous making and breaking of the circuit through the line $F^2$ causes at every such occurrence a spark to jump from the point $g'$ to the platen $g$ and through the strip G, making or burning a hole in the same. The strip G in Fig. 2 is marked into sections representing an hour, and the marks $g^4$, arranged longitudinally, indicate the holes made through the strip between one a. m. and two a. m. and between two a. m. and three a. m.

Presuming that A is the measuring and indicating device of a ship's log and that the hand $c$ makes one revolution of its dial for every mile that the ship travels and that the strip G is made to move the distance of one section every hour, then the parts being as shown in Fig. 1 the operation will be as follows: At the end of every mile of the ship's course the indicator-hand $c$ will strike the plate $d$ and force it into contact with the plate $d'$, closing the circuit through the magnet C, which will at once draw down its armature $c'$ and through the star-wheel D and gear D' rotate the pinion $D^2$ and arm E a half-revolution and cause said arm to connect electrically for an instant the two contacts $f$ $f$. An induced current during such connection will be caused to pass through the secondary coil $F^2$ and a spark will jump from the point $g'$ to the platen $g$ through the strip G, making a hole in the same. The number of holes $g^4$ between the sections on the strip G indicates the number of miles the vessel has traveled each hour, as shown in Fig. 2.

In Fig. 3 I have shown means for recording the distance whether the ship, engine, or other device is going forward or back. In this construction the spring-plate $h$, which is connected with the line 1, is situated between the two fixed plates $h'$ and $h^2$, and the free end of the plate $h$ extends a little over the course of the end of the hand $c$, so that when said hand is revolved in either direction it will strike against the plate $h$ and cause it to bear against either the plate $h'$ or $h^2$. One end of the line 2 is connected with the fixed plate $h'$, and the other end of said line connects with the opposite pole of the generator B to line 1, the coil of a magnet H forming part of said line 2. The plate $h^2$ is connected by the line 3 with the opposite pole of the generator B to line 1, a magnet H', similar to H, forming part of said line. The pivoted armatures I I' of the magnets H H' are normally withheld from their respective magnets by coil-springs $i$ $i$, and stops $i'$ $i^2$ limit the two movements of said armatures. The free end of the armature I extends over a star-wheel J and is adapted to rotate said wheel step by step every time the armature is attracted by its magnet. A holding-dog $j$, engaging with said wheel, prevents its rotation in the opposite direction.

K is a toothed wheel mounted so as to rotate in unison with the star-wheel J. The wheel K is of conducting material and is electrically connected through its support L with the secondary line $F^2$ of the induction-coil F.

M is a contact-plate situated near the wheel K, and during the revolution of the latter its teeth are adapted to touch the plate M for a very short period and for such time close the circuit through the line $F^2$. This plate M is connected to that portion of the line $F^2$ having the point $g'$. The two wheels J' and K' and support L are similar to J, K, and L, above described, and said wheels are operated by the armature I' as the armature I operates the wheels J and K. The holding-pawl $j'$, engaging with the wheel K', is also similar to the pawl $j$.

M' is a contact-plate similar to the plate M and adapted to be made contact with by the teeth of the wheel K' as the wheel K makes contact with the plate M. The support L' is connected with the line $F^2$, and the plate M' is connected to a branch $F^3$ of the line $F^2$, the other end of said branch terminating in a point $g^5$ over the platen $g$, like the point $g'$. The wheels J K J' K', supports L L', and plates M M' are all immersed in oil or other non-conducting liquid in a tank N to preserve insulation between the contacts of the two lines.

The operation of the above construction is as follows: When the ship, engine, or other device is going ahead, the hand $c$ will be caused to turn, in the direction of the arrow $n$, from left to right, and at every revolution of said hand it will force the plate $h$ against the plate $h'$ and close the circuit during such contact through the lines 1 and 2 and magnet H, which will at once attract its armature I, and through the star-wheel J rotate the wheel K, so as to bring one of its teeth for an instant only in contact with the plate M. An induced current during such contact will be caused to pass through the secondary line $F^2$ and a spark will jump from the point $g'$ to the platen $g$ through the strip G', burning or making a hole in the same, as above described. When the ship or engine is traveling backward, the hand $c$ will revolve from right to left in the direction of arrow $n'$ and at every revolution will force the plate $h$ against the plate $h^2$ and close the circuit during such contact through the lines 1 and 3 and magnet H', which will at once attract its armature I' and through the star-wheel J' rotate the wheel K', so as to bring one of its teeth for an instant only in contact with the plate M'. An induced current during such contact will be caused to pass through the secondary line $F^2$ and its branch $F^3$ and a spark will jump from the point $g^5$ to the platen $g$ through the strip G', making a hole in the same. The strip G' is marked "Ahead" and "Back," in line with those portions, respectively, which pass under the points $g'$ and $g^5$; but otherwise it is made like G and travels in the same manner. The number of holes $g^4$ made in the strip G' between the sections opposite the word "Ahead" indicates the distance traveled each hour ahead, and the number of holes $g^6$ opposite the word "Back" indicates the number of miles traveled backward each hour.

While I have herein shown the speed-indicator having an arm adapted to close the circuit once in each revolution, it is evident that the circuit may be closed for each predetermined fraction of a revolution—for instance, by using two or more arms, each adapted to engage with the circuit-closer.

What I claim as new is—

1. In a speed indicator and recorder, the combination with an electric circuit, a magnet forming part of the same, and means for closing and breaking said circuit, two contacts adapted to be connected and disconnected instantly by the armature of said magnet, an induction-coil terminating in said contacts and having a break, and means for moving a strip through the break, whereby the making and breaking of the circuit through said coil will cause sparks to jump across its break and through the strip making holes in the same, all as set forth.

2. In combination with the moving arm of a distance-measuring or speed-indicating device, of an electric circuit adapted to be closed and broken by said arm, a magnet forming part of said circuit, two contacts adapted to be connected and disconnected instantly by the armature of said magnet, an induction-coil terminating in said contacts and having a break, and means for regularly moving a strip through the break; whereby the making and breaking of the circuit through said coil will cause sparks to jump across its break and through the strip making holes in the same, all as set forth.

3. In combination with the moving arm of a distance-measuring or speed-indicating device, of an electric circuit adapted to be closed and broken by said arm, a magnet forming part of said circuit, two contacts adapted to be connected and disconnected instantly by the armature of said magnet, an induction-coil terminating in said contacts and having a break, and means for moving a strip divided into sections of equal lengths through the break the length of each section in a certain time; whereby the making and breaking of the circuit through said coil will cause sparks to jump across its break, and through the strip, making holes in the same, all as set forth.

4. In combination with the moving arm of a distance-measuring or speed-indicating device, of an electric circuit adapted to be closed and broken by said arm, a magnet forming part of said circuit, a toothed wheel adapted to be rotated by said armature, a revolving contact-arm caused to rotate by the rotation of said wheel, two contact-plates adapted to be connected by said arm at a certain point of its revolution, an induction-coil terminating in said plates and having a break, and means for moving a strip through said break, all combined and operating in the manner set forth.

5. In combination with the moving arm of a distance-measuring or speed-indicating device, of an electric circuit adapted to be closed and broken by said arm, a magnet forming part of said circuit, a toothed wheel engaging with said armature and adapted to be operated by the same, the gear D' adapted to rotate in unison with said wheel, the pinion $D^2$ engaging with said gear, the diametric arm E mounted to revolve in unison with said pinion, the contacts *f f*, an induction-coil terminating in said contacts, and a recording device adapted to be operated by making and breaking the circuit of said coil, all as set forth.

6. In combination with the moving arm of a distance-measuring or speed-indicating device, said arm being adapted to travel in two opposite directions, of three contact-plates, one being between the other two and extending over the course of said arm, two electric circuits each having the middle plate for one terminal and the two other plates for the other terminals respectively, two magnets adapted to be respectively vitalized by the closing of the two circuits, an induction-coil having a branch line, and the two terminals of said coil and branch being provided with contacts, and said contacts of the coil and branch being respectively adapted to be connected and disconnected instantly by the armatures of the respective magnets, and a recording device adapted to be operated by making and breaking the circuits of said coil and branch, all as set forth.

7. In combination with the moving arm of a distance-measuring or speed-indicating device, said arm being adapted to travel in two opposite directions, of three contact-plates, one being between the other two and extending over the course of said arm, two electric circuits each having the middle plate for one terminal and the other two plates for the other terminals respectively, two magnets adapted to be vitalized by the closing of the two circuits, an induction-coil having a branch line, and the two terminals of said coil and branch being provided with contacts, and said contacts of the coil and branch being respectively adapted to be connected and disconnected instantly by the armatures of the respective magnets, the coil and branch each having a break, and means for moving a strip through said breaks, all combined and operating as set forth.

8. In combination with the moving arm of a distance-measuring or speed-indicating device, said arm being adapted to travel in two opposite directions, of three contact-plates, one being between the other two and extending over the course of said arm, two electric circuits each having the middle plates for one terminal and the two other plates for the other terminals respectively, two magnets adapted to be vitalized by the closing of the two circuits, an induction-coil having a branch line, and the two terminals of said coil and branch being provided with contacts; the contacts of the coil and branch respectively adapted to be connected and disconnected instantly by the armatures of the respective magnets, the coil and branch each having a break, and means for moving a strip through said breaks a uniform distance in a certain time, all combined and operating as set forth.

In testimony that I claim the foregoing as my invention I have signed my name, in presence of two witnesses, this 2d day of August, 1897.

CHARLES L. JAEGER.

Witnesses:
EUGENIE A. PERSIDES,
A. FABER DU FAUR, Jr.